US011457233B2

(12) United States Patent
Yu et al.

(10) Patent No.: US 11,457,233 B2
(45) Date of Patent: Sep. 27, 2022

(54) MOTION INFORMATION STORAGE FOR VIDEO CODING AND SIGNALING

(71) Applicant: ARRIS Enterprises LLC, Suwanee, GA (US)

(72) Inventors: Yue Yu, San Diego, CA (US); Krit Panusopone, San Diego, CA (US); Limin Wang, San Diego, CA (US); Seungwook Hong, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 46 days.

(21) Appl. No.: 16/383,550

(22) Filed: Apr. 12, 2019

(65) Prior Publication Data

US 2020/0329246 A1 Oct. 15, 2020
US 2021/0029364 A9 Jan. 28, 2021

Related U.S. Application Data

(60) Provisional application No. 62/656,743, filed on Apr. 12, 2018, provisional application No. 62/656,763, (Continued)

(51) Int. Cl.
*H04N 19/137* (2014.01)
*H04N 19/52* (2014.01)
(Continued)

(52) U.S. Cl.
CPC ........... *H04N 19/52* (2014.11); *H04N 19/137* (2014.11); *H04N 19/159* (2014.11); *H04N 19/176* (2014.11); *H04N 19/188* (2014.11)

(58) Field of Classification Search
None
See application file for complete search history.

(56) References Cited

U.S. PATENT DOCUMENTS

2013/0114720 A1* 5/2013 Wang .................. H04N 19/513
  375/240.16
2013/0182769 A1* 7/2013 Yu ....................... H04N 19/105
  375/240.16
(Continued)

FOREIGN PATENT DOCUMENTS

EP          2515542 A2      10/2012
WO      2013/075042 A1       5/2013
WO  WO-2016160608 A1 *  10/2016  .......... H04N 19/139

OTHER PUBLICATIONS

J. Chen, et al., "Algorithm Description of Joint Exploration Test Model 5 (JEM 5)", 5th JVET Meeting, Geneva, JVET-E1001-V2, Jan. 2017, 44 pgs.

(Continued)

*Primary Examiner* — Dave Czekaj
*Assistant Examiner* — Shanika M Brumfield
(74) *Attorney, Agent, or Firm* — Chernoff, Vilhauer, McClung & Stenzel, LLP

(57) ABSTRACT

A method for inter-coding video in which encoder and decoder memory requirements associated with storage of motion information related to collocated coding units is reduced. In the method motion information related to only a single or reduced set of collocated coding unit(s) may be stored at the encoder and decoder. In operation, if the encoder determines that motion information for a current coding unit should replace a currently stored motion information for currently stored motion information for the collocated coding unit, then the encoder can replace the motion information at the encoder and transmit an indicator with the current coding unit to signal to the decoder that currently stored motion information currently should be updated or replaced with the motion information associated with the current coding unit.

6 Claims, 12 Drawing Sheets

Related U.S. Application Data filed on Apr. 12, 2018, provisional application No. 62/660,883, filed on Apr. 20, 2018, provisional application No. 62/678,864, filed on May 31, 2018.

(51) Int. Cl.
*H04N 19/169* (2014.01)
*H04N 19/159* (2014.01)
*H04N 19/176* (2014.01)

(56) References Cited

U.S. PATENT DOCUMENTS

| | | | |
|---|---|---|---|
| 2014/0023142 A1* | 1/2014 | Yu | H04N 19/463 375/240.16 |
| 2018/0359483 A1* | 12/2018 | Chen | H04N 19/44 |
| 2019/0246118 A1* | 8/2019 | Ye | H04N 19/52 |
| 2019/0313115 A1* | 10/2019 | Chao | H04N 19/513 |
| 2019/0364284 A1* | 11/2019 | Moon | H04N 19/176 |

OTHER PUBLICATIONS

PCT International Search Report & Written Opinion, RE: Application No. PCT/US2019/027399, dated Jun. 6, 2019.

"High Efficienty Video Coding (HEVC"Test Model 16 (HM 16) Encoder Description Update 8, 118th MPEG Meting, Hobart, No. N16879, Jul. 16, 2017.

T. Hellman, et al., "Limiting Collocated Temporal Reference to One Per Picture", 99th MPEG Meeting, San Jose, No. m23318, Feb. 2, 2012.

* cited by examiner

FIG. 2b   FIG. 2c

MOTION INFORMATION STORAGE FOR VIDEO CODING AND SIGNALING

CLAIM OF PRIORITY

This application claims priority under 35 U.S.C. § 119(e) from earlier filed U.S. Provisional Application Ser. No. 62/656,743, filed Apr. 12, 2018, U.S. Provisional Application Ser. No. 62/656,763, filed Apr. 12, 2018, United States Provisional Application Ser. No. 62/660,883, filed Apr. 20, 2018 and U.S. Provisional Application Ser. No. 62/678,864, filed May 31, 2018 the entireties of each of which are hereby incorporated herein by reference.

TECHNICAL FIELD

The present disclosure relates to the field of video coding, particularly coding efficiency increases and reduced memory burden associated with control of the number of stored collocated pictures and memory requirements.

BACKGROUND

The technical improvements in evolving video coding standards illustrate the trend of increasing coding efficiency to enable higher bit-rates, higher resolutions, and better video quality. The Joint Video Exploration Team developed a new video coding scheme referred to as JVET and is developing a newer video coding scheme referred to a Versatile Video Coding (VVC)—the complete contents of the VVC 7$^{th}$ edition of draft 2 of the standard titled Versatile Video Coding (Draft 2) by JVET published Oct. 1, 2018 is hereby incorporated herein by reference. Similar to other video coding schemes like HEVC (High Efficiency Video Coding), both JVET and VVC are block-based hybrid spatial and temporal predictive coding schemes. However, relative to HEVC, JVET and VVC include many modifications to bitstream structure, syntax, constraints, and mapping for the generation of decoded pictures. JVET has been implemented in Joint Exploration Model (JEM) encoders and decoders, but VVC is not anticipated to be implemented until early 2020.

Current and anticipated video coding schemes typically require that multiple pictures be stored at both the encoder and decoder in order to code and decode video. However, transmission and storage of such information can be burdensome. Accordingly, what is needed is a system and method of motion information storage for video coding and signaling that reduces system burdens.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect can comprise receiving a first coding unit; receiving a second coding unit; determining whether said first coding unit and said second coding unit are parts of a single collocated picture; and encoding a current coding unit using motion information associated with said first coding unit and said second coding unit if said first coding unit and said second coding unit are parts of a single collocated picture. Other embodiments of this aspect include corresponding computer systems, apparatus, and computer programs recorded on one or more computer storage devices, each configured to perform the actions of the methods.

Implementations can further comprise one or more of the following features: the method of inter-coding where said motion information associated with said first coding unit is normalized; the method of inter-coding where said motion information associated with said second coding unit is normalized; the method of inter-coding where an indicator indicates whether said first coding unit and said second coding unit are parts of a single collocated picture; the method of inter-coding where said indicator is included in a NAL unit associated with said current coding unit. The method of inter-coding where said indicator is a single bit. Implementations of the described techniques may include hardware, a method or process, or computer software on a computer-accessible medium.

One general can also comprise a system of inter-coding comprising: receiving a first coding unit in a first portion of memory, receiving a second coding unit in a second portion of said memory, determining whether said first coding unit and said second coding unit are parts of a single collocated picture, and encoding a current coding unit using motion information associated with said first coding unit and said second coding unit if said first coding unit and said second coding unit are parts of a single collocated picture. Other embodiments of this aspect can include corresponding computer systems, apparatus, and computer programs recorded on one or more computer storage devices, each configured to perform the actions of the methods.

BRIEF DESCRIPTION OF THE DRAWINGS

Further details of the present invention are explained with the help of the attached drawings in which:

FIG. 2a-2c depict exemplary partitioning of a CTU into Coding Units (CUs).

DETAILED DESCRIPTION

Figure 1:
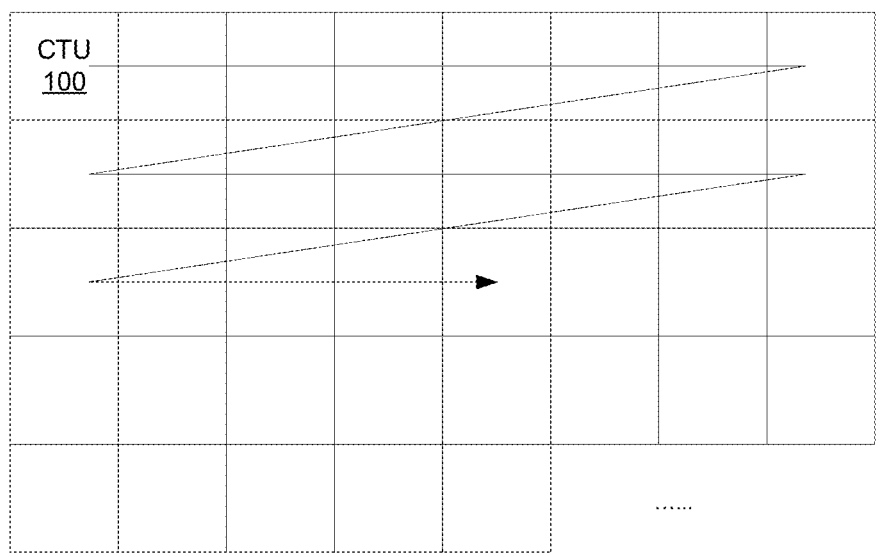
FIG. 1 depicts division of a frame into a plurality of Coding Tree Units (CTUs).

FIG. 1 depicts division of a frame into a plurality of Coding Tree Units (CTUs) 100. A frame can be an image in a video sequence. A frame can include a matrix, or set of matrices, with pixel values representing intensity measures in the image. Thus, a set of these matrices can generate a video sequence. Pixel values can be defined to represent color and brightness in full color video coding, where pixels are divided into three channels. For example, in a YCbCr color space pixels can have a luma value, Y, that represents gray level intensity in the image, and two chrominance values, Cb and Cr, that represent the extent to which color differs from gray to blue and red. In other embodiments, pixel values can be represented with values in different color spaces or models. The resolution of the video can determine the number of pixels in a frame. A higher resolution can mean more pixels and a better definition of the image, but can also lead to higher bandwidth, storage, and transmission requirements.

Frames of a video sequence can be encoded and decoded using JVET. JVET is a video coding scheme being developed by the Joint Video Exploration Team. Versions of JVET have been implemented in JEM (Joint Exploration Model) encoders and decoders. Similar to other video coding schemes like HEVC (High Efficiency Video Coding), JVET is a block-based hybrid spatial and temporal predictive coding scheme. During coding with JVET, a frame is first divided into square blocks called CTUs 100, as shown in FIG. 1. For example, CTUs 100 can be blocks of 128×128 pixels.

Figure 2A:
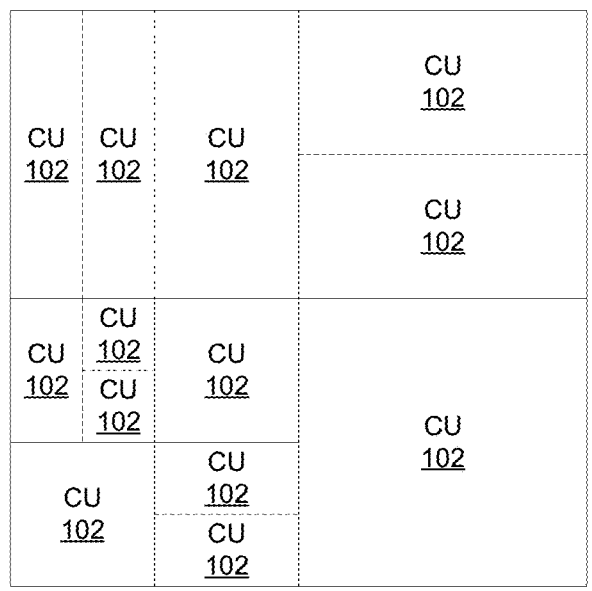

FIG. 2a depicts an exemplary partitioning of a CTU 100 into CUs 102. Each CTU 100 in a frame can be partitioned into one or more CUs (Coding Units) 102. CUs 102 can be used for prediction and transform as described below. Unlike HEVC, in JVET the CUs 102 can be rectangular or square and can be coded without further partitioning into prediction units or transform units. The CUs 102 can be as large as their root CTUs 100, or be smaller subdivisions of a root CTU 100 as small as 4×4 blocks.

In JVET, a CTU 100 can be partitioned into CUs 102 according to a quadtree plus binary tree (QTBT) scheme in which the CTU 100 can be recursively split into square blocks according to a quadtree, and those square blocks can then be recursively split horizontally or vertically according to binary trees. Parameters can be set to control splitting according to the QTBT, such as the CTU size, the minimum sizes for the quadtree and binary tree leaf nodes, the maximum size for the binary tree root node, and the maximum depth for the binary trees. In VVC, a CTU 100 can be portioned into CUs utilizing ternary splitting also.

By way of a non-limiting example, FIG. 2a shows a CTU 100 partitioned into CUs 102, with solid lines indicating quadtree splitting and dashed lines indicating binary tree splitting. As illustrated, the binary splitting allows horizontal splitting and vertical splitting to define the structure of the CTU and its subdivision into CUs. FIGS. 2b & 2c depict alternate, non-limiting examples of ternary splitting of a CU wherein subdivisions of the CUs are non-equal.

Figure 3:
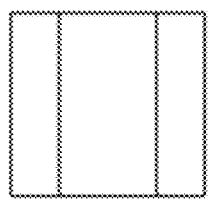
FIG. 3 depicts a quadtree plus binary tree (QTBT) representation of FIG. 2's CU partitioning.
Figure 3:
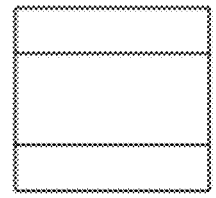
Figure 3:
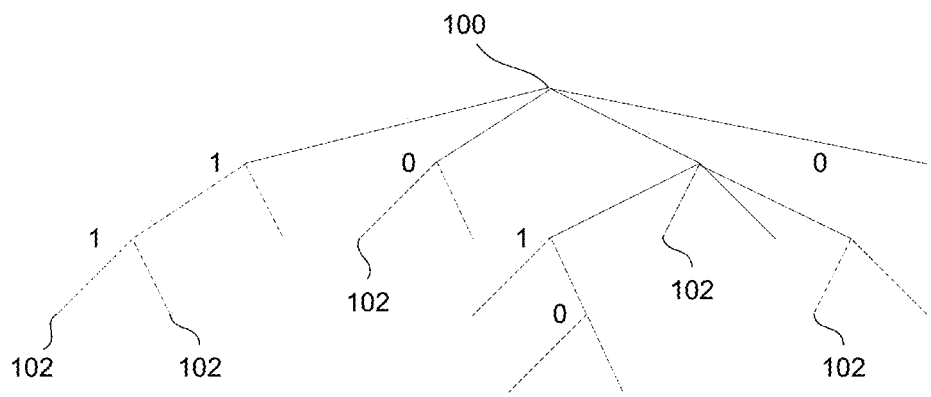

FIG. 3 depicts a QTBT representation of FIG. 2's partitioning. A quadtree root node represents the CTU 100, with each child node in the quadtree portion representing one of four square blocks split from a parent square block. The square blocks represented by the quadtree leaf nodes can then be divided zero or more times using binary trees, with the quadtree leaf nodes being root nodes of the binary trees. At each level of the binary tree portion, a block can be divided either vertically or horizontally. A flag set to "0" indicates that the block is split horizontally, while a flag set to "1" indicates that the block is split vertically.

After quadtree splitting and binary tree splitting, the blocks represented by the QTBT's leaf nodes represent the final CUs 102 to be coded, such as coding using inter prediction or intra prediction. For slices or full frames coded with inter prediction, different partitioning structures can be used for luma and chroma components. For example, for an inter slice a CU 102 can have Coding Blocks (CBs) for different color components, such as such as one luma CB and two chroma CBs. For slices or full frames coded with intra prediction, the partitioning structure can be the same for luma and chroma components.

Figure 4:
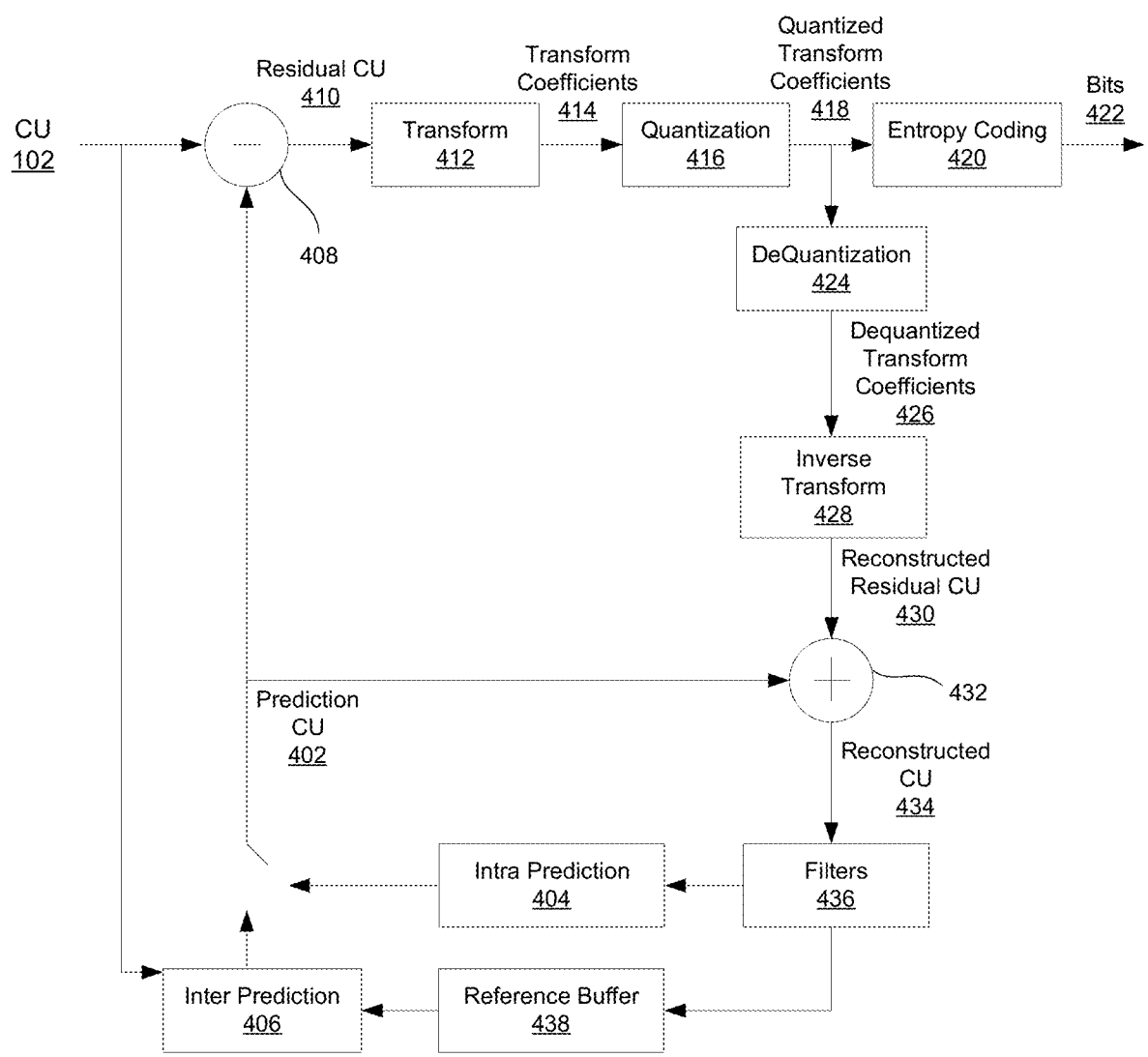
FIG. 4 depicts a simplified block diagram for CU coding in a JVET or VVC encoder.

FIG. 4 depicts a simplified block diagram for CU coding in a JVET encoder. The main stages of video coding include partitioning to identify CUs 102 as described above, followed by encoding CUs 102 using prediction at 404 or 406, generation of a residual CU 410 at 408, transformation at 412, quantization at 416, and entropy coding at 420. The encoder and encoding process illustrated in FIG. 4 also includes a decoding process that is described in more detail below.

Given a current CU 102, the encoder can obtain a prediction CU 402 either spatially using intra prediction at 404 or temporally using inter prediction at 406. The basic idea of prediction coding is to transmit a differential, or residual, signal between the original signal and a prediction for the original signal. At the receiver side, the original signal can be reconstructed by adding the residual and the prediction, as will be described below. Because the differential signal has a lower correlation than the original signal, fewer bits are needed for its transmission.

A slice, such as an entire picture or a portion of a picture, coded entirely with intra-predicted CUs can be an I slice that can be decoded without reference to other slices, and as such can be a possible point where decoding can begin. A slice coded with at least some inter-predicted CUs can be a predictive (P) or bi-predictive (B) slice that can be decoded based on one or more reference pictures. P slices may use intra-prediction and inter-prediction with previously coded slices. For example, P slices may be compressed further than the I-slices by the use of inter-prediction, but need the coding of a previously coded slice to code them. B slices can use data from previous and/or subsequent slices for its coding, using intra-prediction or inter-prediction using an interpolated prediction from two different frames, thus increasing the accuracy of the motion estimation process. In some cases P slices and B slices can also or alternately be encoded using intra block copy, in which data from other portions of the same slice is used.

As will be discussed below, intra prediction or inter prediction can be performed based on reconstructed CUs 434 from previously coded CUs 102, such as neighboring CUs 102 or CUs 102 in reference pictures.

When a CU 102 is coded spatially with intra prediction at 404, an intra prediction mode can be found that best predicts pixel values of the CU 102 based on samples from neighboring CUs 102 in the picture.

Figure 5:
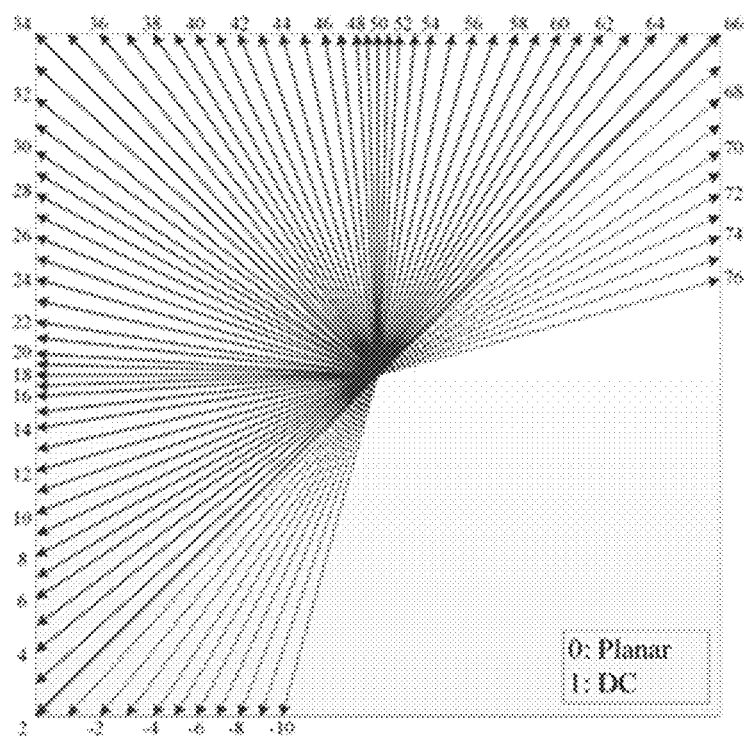
FIG. 5 depicts possible intra prediction modes for luma components in JVET of VVC.

When coding a CU's luma component, the encoder can generate a list of candidate intra prediction modes. While HEVC had 35 possible intra prediction modes for luma components, in JVET there are 67 possible intra prediction modes for luma components and in VVC there are 85 prediction modes. These include a planar mode that uses a three dimensional plane of values generated from neighboring pixels, a DC mode that uses values averaged from neighboring pixels, the 65 directional modes shown in FIG. 5 that use values copied from neighboring pixels along the solid-line indicated directions and 18 wide-angle prediction modes that can be used with non-square blocks.

When generating a list of candidate intra prediction modes for a CU's luma component, the number of candidate modes on the list can depend on the CU's size. The candidate list can include: a subset of HEVC's 35 modes with the lowest SATD (Sum of Absolute Transform Difference) costs; new directional modes added for JVET that neighbor the candidates found from the HEVC modes; and modes from a set of six most probable modes (MPMs) for the CU 102 that are identified based on intra prediction modes used for previously coded neighboring blocks as well as a list of default modes.

When coding a CU's chroma components, a list of candidate intra prediction modes can also be generated. The list of candidate modes can include modes generated with cross-component linear model projection from luma samples, intra prediction modes found for luma CBs in particular collocated positions in the chroma block, and chroma prediction modes previously found for neighboring blocks. The encoder can find the candidate modes on the lists with the lowest rate distortion costs, and use those intra prediction modes when coding the CU's luma and chroma components. Syntax can be coded in the bitstream that indicates the intra prediction modes used to code each CU 102.

After the best intra prediction modes for a CU 102 have been selected, the encoder can generate a prediction CU 402 using those modes. When the selected modes are directional modes, a 4-tap filter can be used to improve the directional accuracy. Columns or rows at the top or left side of the prediction block can be adjusted with boundary prediction filters, such as 2-tap or 3-tap filters.

The prediction CU 402 can be smoothed further with a position dependent intra prediction combination (PDPC) process that adjusts a prediction CU 402 generated based on filtered samples of neighboring blocks using unfiltered samples of neighboring blocks, or adaptive reference sample smoothing using 3-tap or 5-tap low pass filters to process reference samples.

When a CU 102 is coded temporally with inter prediction at 406, a set of motion vectors (MVs) can be found that points to samples in reference pictures that best predict pixel values of the CU 102. Inter prediction exploits temporal redundancy between slices by representing a displacement of a block of pixels in a slice. The displacement is determined according to the value of pixels in previous or following slices through a process called motion compensation. Motion vectors and associated reference indices that indicate pixel displacement relative to a particular reference picture can be provided in the bitstream to a decoder, along with the residual between the original pixels and the motion compensated pixels. The decoder can use the residual and signaled motion vectors and reference indices to reconstruct a block of pixels in a reconstructed slice.

In JVET, motion vector accuracy can be stored at 1/16 pel, and the difference between a motion vector and a CU's predicted motion vector can be coded with either quarter-pel resolution or integer-pel resolution.

In JVET motion vectors can be found for multiple sub-CUs within a CU 102, using techniques such as advanced temporal motion vector prediction (ATMVP), spatial-temporal motion vector prediction (STMVP), affine motion compensation prediction, pattern matched motion vector derivation (PMMVD), and/or bi-directional optical flow (BIO).

Using ATMVP, the encoder can find a temporal vector for the CU 102 that points to a corresponding block in a reference picture. The temporal vector can be found based on motion vectors and reference pictures found for previously coded neighboring CUs 102. Using the reference block pointed to by a temporal vector for the entire CU 102, a motion vector can be found for each sub-CU within the CU 102.

STMVP can find motion vectors for sub-CUs by scaling and averaging motion vectors found for neighboring blocks previously coded with inter prediction, together with a temporal vector.

Affine motion compensation prediction can be used to predict a field of motion vectors for each sub-CU in a block, based on two control motion vectors found for the top corners of the block. For example, motion vectors for sub-CUs can be derived based on top corner motion vectors found for each 4×4 block within the CU 102.

PMMVD can find an initial motion vector for the current CU 102 using bilateral matching or template matching. Bilateral matching can look at the current CU 102 and reference blocks in two different reference pictures along a motion trajectory, while template matching can look at corresponding blocks in the current CU 102 and a reference picture identified by a template. The initial motion vector found for the CU 102 can then be refined individually for each sub-CU.

BIO can be used when inter prediction is performed with bi-prediction based on earlier and later reference pictures, and allows motion vectors to be found for sub-CUs based on the gradient of the difference between the two reference pictures.

In some situations local illumination compensation (LIC) can be used at the CU level to find values for a scaling factor parameter and an offset parameter, based on samples neighboring the current CU 102 and corresponding samples neighboring a reference block identified by a candidate motion vector. In JVET, the LIC parameters can change and be signaled at the CU level.

For some of the above methods the motion vectors found for each of a CU's sub-CUs can be signaled to decoders at the CU level. For other methods, such as PMMVD and BIO, motion information is not signaled in the bitstream to save overhead, and decoders can derive the motion vectors through the same processes.

After the motion vectors for a CU 102 have been found, the encoder can generate a prediction CU 402 using those motion vectors. In some cases, when motion vectors have been found for individual sub-CUs, Overlapped Block Motion Compensation (OBMC) can be used when generating a prediction CU 402 by combining those motion vectors with motion vectors previously found for one or more neighboring sub-CUs.

When bi-prediction is used, JVET can use decoder-side motion vector refinement (DMVR) to find motion vectors. DMVR allows a motion vector to be found based on two motion vectors found for bi-prediction using a bilateral template matching process. In DMVR, a weighted combination of prediction CUs 402 generated with each of the two motion vectors can be found, and the two motion vectors can be refined by replacing them with new motion vectors that best point to the combined prediction CU 402. The two refined motion vectors can be used to generate the final prediction CU 402.

At 408, once a prediction CU 402 has been found with intra prediction at 404 or inter prediction at 406 as described above, the encoder can subtract the prediction CU 402 from the current CU 102 find a residual CU 410.

The encoder can use one or more transform operations at 412 to convert the residual CU 410 into transform coefficients 414 that express the residual CU 410 in a transform domain, such as using a discrete cosine block transform (DCT-transform) to convert data into the transform domain. JVET allows more types of transform operations than HEVC, including DCT-II, DST-VII, DST-VII, DCT-VIII, DST-I, and DCT-V operations. The allowed transform operations can be grouped into sub-sets, and an indication of which sub-sets and which specific operations in those sub-sets were used can be signaled by the encoder. In some cases, large block-size transforms can be used to zero out high frequency transform coefficients in CUs 102 larger than a certain size, such that only lower-frequency transform coefficients are maintained for those CUs 102.

In some cases a mode dependent non-separable secondary transform (MDNSST) can be applied to low frequency transform coefficients 414 after a forward core transform. The MDNSST operation can use a Hypercube-Givens Transform (HyGT) based on rotation data. When used, an index value identifying a particular MDNSST operation can be signaled by the encoder.

At 416, the encoder can quantize the transform coefficients 414 into quantized transform coefficients 416. The quantization of each coefficient may be computed by dividing a value of the coefficient by a quantization step, which is derived from a quantization parameter (QP). In some embodiments, the Qstep is defined as $2^{(QP-4)/6}$. Because high precision transform coefficients 414 can be converted into quantized transform coefficients 416 with a finite number of possible values, quantization can assist with data compression. Thus, quantization of the transform coefficients may limit an amount of bits generated and sent by the transformation process. However, while quantization is a lossy operation, and the loss by quantization cannot be recovered, the quantization process presents a trade-off between quality of the reconstructed sequence and an amount of information needed to represent the sequence. For example, a lower QP value can result in better quality decoded video, although a higher amount of data may be required for representation and transmission. In contrast, a high QP value can result in lower quality reconstructed video sequences but with lower data and bandwidth needs.

JVET can utilize variance-based adaptive quantization techniques, which allows every CU 102 to use a different quantization parameter for its coding process (instead of using the same frame QP in the coding of every CU 102 of the frame). The variance-based adaptive quantization techniques adaptively lowers the quantization parameter of certain blocks while increasing it in others. To select a specific QP for a CU 102, the CU's variance is computed. In brief, if a CU's variance is higher than the average variance of the frame, a higher QP than the frame's QP may be set for the CU 102. If the CU 102 presents a lower variance than the average variance of the frame, a lower QP may be assigned.

At 420, the encoder can find final compression bits 422 by entropy coding the quantized transform coefficients 418. Entropy coding aims to remove statistical redundancies of the information to be transmitted. In NET, CABAC (Context Adaptive Binary Arithmetic Coding) can be used to code the quantized transform coefficients 418, which uses probability measures to remove the statistical redundancies. For CUs 102 with non-zero quantized transform coefficients 418, the quantized transform coefficients 418 can be converted into binary. Each bit ("bin") of the binary representation can then be encoded using a context model. A CU 102 can be broken up into three regions, each with its own set of context models to use for pixels within that region.

Multiple scan passes can be performed to encode the bins. During passes to encode the first three bins (bin0, bin1, and bin2), an index value that indicates which context model to use for the bin can be found by finding the sum of that bin position in up to five previously coded neighboring quantized transform coefficients 418 identified by a template.

A context model can be based on probabilities of a bin's value being '0' or '1'. As values are coded, the probabilities in the context model can be updated based on the actual number of '0' and '1' values encountered. While HEVC used fixed tables to re-initialize context models for each new picture, in JVET the probabilities of context models for new inter-predicted pictures can be initialized based on context models developed for previously coded inter-predicted pictures.

The encoder can produce a bitstream that contains entropy encoded bits 422 of residual CUs 410, prediction information such as selected intra prediction modes or motion vectors, indicators of how the CUs 102 were partitioned from a CTU 100 according to the QTBT structure, and/or other information about the encoded video. The bitstream can be decoded by a decoder as discussed below.

In addition to using the quantized transform coefficients 418 to find the final compression bits 422, the encoder can also use the quantized transform coefficients 418 to generate reconstructed CUs 434 by following the same decoding process that a decoder would use to generate reconstructed CUs 434. Thus, once the transformation coefficients have been computed and quantized by the encoder, the quantized transform coefficients 418 may be transmitted to the decoding loop in the encoder. After quantization of a CU's transform coefficients, a decoding loop allows the encoder to generate a reconstructed CU 434 identical to the one the decoder generates in the decoding process. Accordingly, the encoder can use the same reconstructed CUs 434 that a decoder would use for neighboring CUs 102 or reference pictures when performing intra prediction or inter prediction for a new CU 102. Reconstructed CUs 102, reconstructed slices, or full reconstructed frames may serve as references for further prediction stages.

At the encoder's decoding loop (and see below, for the same operations in the decoder) to obtain pixel values for the reconstructed image, a dequantization process may be performed. To dequantize a frame, for example, a quantized value for each pixel of a frame is multiplied by the quantization step, e.g., (Qstep) described above, to obtain reconstructed dequantized transform coefficients 426. For example, in the decoding process shown in FIG. 4 in the encoder, the quantized transform coefficients 418 of a residual CU 410 can be dequantized at 424 to find dequantized transform coefficients 426. If an MDNSST operation was performed during encoding, that operation can be reversed after dequantization.

At 428, the dequantized transform coefficients 426 can be inverse transformed to find a reconstructed residual CU 430, such as by applying a DCT to the values to obtain the reconstructed image. At 432 the reconstructed residual CU 430 can be added to a corresponding prediction CU 402 found with intra prediction at 404 or inter prediction at 406, in order to find a reconstructed CU 434.

At 436, one or more filters can be applied to the reconstructed data during the decoding process (in the encoder or, as described below, in the decoder), at either a picture level or CU level. For example, the encoder can apply a deblocking filter, a sample adaptive offset (SAO) filter, and/or an adaptive loop filter (ALF). The encoder's decoding process may implement filters to estimate and transmit to a decoder the optimal filter parameters that can address potential artifacts in the reconstructed image. Such improvements increase the objective and subjective quality of the reconstructed video. In deblocking filtering, pixels near a sub-CU boundary may be modified, whereas in SAO, pixels in a CTU 100 may be modified using either an edge offset or band offset classification. JVET's ALF can use filters with circularly symmetric shapes for each 2×2 block. An indication of the size and identity of the filter used for each 2×2 block can be signaled.

If reconstructed pictures are reference pictures, they can be stored in a reference buffer 438 for inter prediction of future CUs 102 at 406.

During the above steps, JVET allows a content adaptive clipping operations to be used to adjust color values to fit between lower and upper clipping bounds. The clipping bounds can change for each slice, and parameters identifying the bounds can be signaled in the bitstream.

Figure 6:
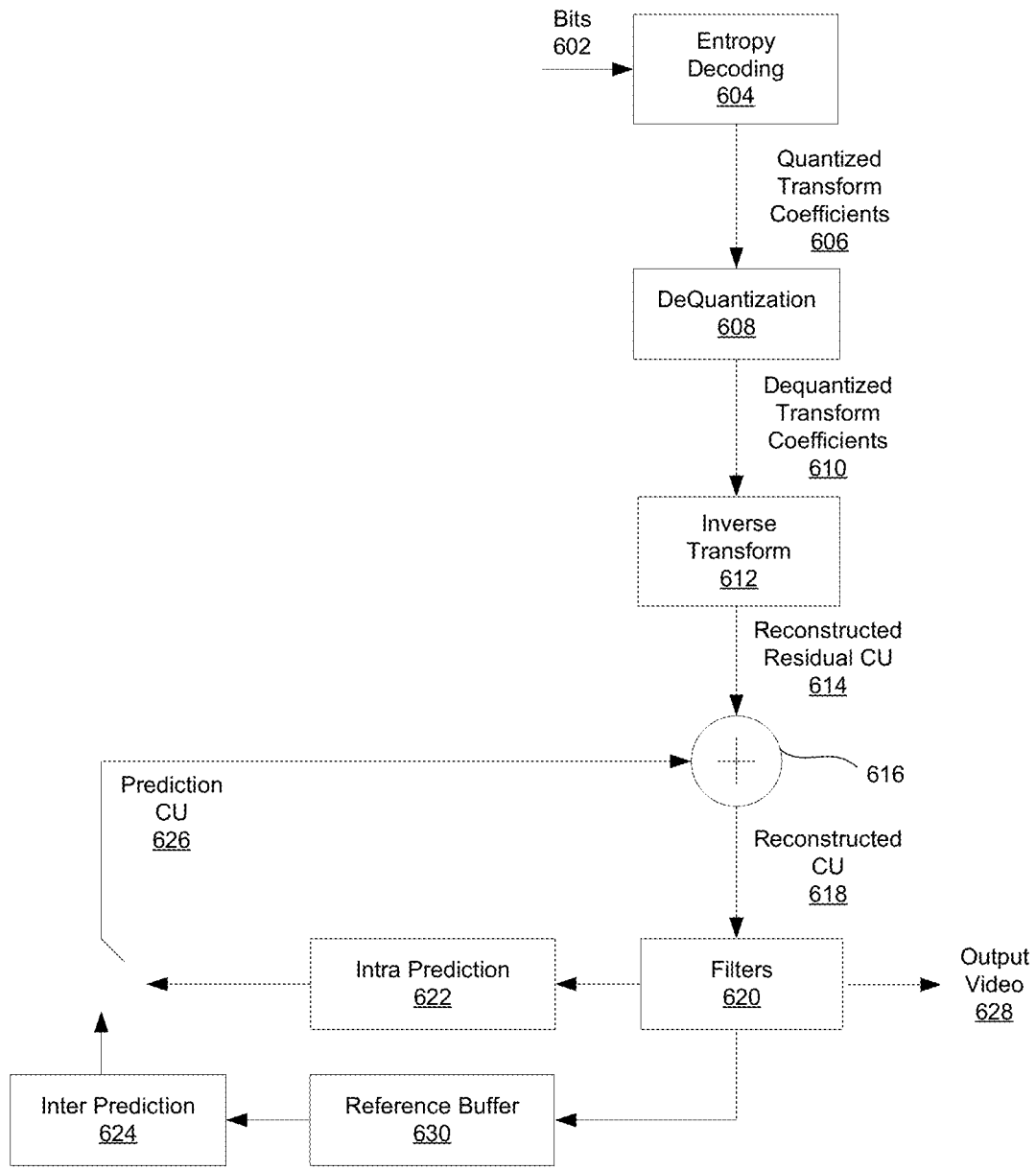
FIG. 6 depicts a simplified block diagram for CU coding in a JVET of VVC decoder.

FIG. 6 depicts a simplified block diagram for CU coding in a JVET decoder. A JVET decoder can receive a bitstream containing information about encoded CUs 102. The bitstream can indicate how CUs 102 of a picture were partitioned from a CTU 100 according to a QTBT structure, prediction information for the CUs 102 such as intra prediction modes or motion vectors, and bits 602 representing entropy encoded residual CUs.

At 604 the decoder can decode the entropy encoded bits 602 using the CABAC context models signaled in the bitstream by the encoder. The decoder can use parameters signaled by the encoder to update the context models' probabilities in the same way they were updated during encoding.

After reversing the entropy encoding at 604 to find quantized transform coefficients 606, the decoder can dequantize them at 608 to find dequantized transform coefficients 610. If an MDNSST operation was performed during encoding, that operation can be reversed by the decoder after dequantization.

At 612, the dequantized transform coefficients 610 can be inverse transformed to find a reconstructed residual CU 614. At 616, the reconstructed residual CU 614 can be added to a corresponding prediction CU 626 found with intra prediction at 622 or inter prediction at 624, in order to find a reconstructed CU 618.

At 620, one or more filters can be applied to the reconstructed data, at either a picture level or CU level. For example, the decoder can apply a deblocking filter, a sample adaptive offset (SAO) filter, and/or an adaptive loop filter (ALF). As described above, the in-loop filters located in the decoding loop of the encoder may be used to estimate optimal filter parameters to increase the objective and subjective quality of a frame. These parameters are transmitted to the decoder to filter the reconstructed frame at 620 to match the filtered reconstructed frame in the encoder.

After reconstructed pictures have been generated by finding reconstructed CUs 618 and applying signaled filters, the decoder can output the reconstructed pictures as output video 628. If reconstructed pictures are to be used as reference pictures, they can be stored in a reference buffer 630 for inter prediction of future CUs 102 at 624.

Motion information of a current picture is said to have strong correlation with motion information of the previously coded picture(s). Motion information of a block can include the block's coding mode, motion vectors and reference indices from reference lists. A current block in a current picture can use motion information of its collocated block in previously coded pictures to derive its own motion information. This concept has been used in the existing video compression standards, such as MPEG-4 AVC/H.264, HEVC, VP 9, VP 10 and other compression methods. In fact, MPEG-4 AVC/H.264, HEVC and VVC derives their direct mode for a current block in a current picture using the motion information of the current block's collocated block in one of the previously coded pictures. Additionally, HEVC and VVC derive both temporal motion vector prediction (TMVP) and merge mode for a current block in a current picture using motion information of the current block's collocated block in one of the previously coded pictures.

Temporal predication with multiple reference pictures is one of the powerful tools in many existing video compression standards, such as, by way of non-limiting example MPEG-4 AVC/H.264, HEVC and VVC. In operation, for a current (inter) picture, among the reference pictures, one of the reference pictures is defined as collocated picture and motion information of all the blocks of the collocated picture will be available for coding/decoding blocks of the current picture. The motion information, including mode, motion vectors and reference indices from the reference lists, of all blocks in the collocated pictures therefore need to be kept/stored at/in both encoder and decoder. In addition, since a current picture can use any reference picture in a reference picture buffer as its collocated picture, the motion information of all the reference pictures is stored. This storage is very costly in terms of encoder and decoder memories.

In operation in HEVC, one enabled flag at the SPS, sps_temporal_mvp_enabled_flag, is defined to enable/disable using of temporal motion information for a whole sequence. Once it is enabled at the SPS level, another enabled flag, slice_temporal_mvp_enabled_flag, is signalled at the slice level to further control whether temporal motion information is to be used or not for the current slice. If temporal motion information is enabled at the slice level, one syntax element, collocated_from_l0_flag, is then defined in the slice header. This flag is used to indicate which list is to be used to identify the collocated picture. If collocated_from_l0_flag is equal to 1, it specifies that the collocated picture is to be defined from list 0, otherwise, if collocated_from_l0_flag is equal to 0, the collocated picture is to be defined from list 1. If the number of reference pictures in the identified list is only one, the picture in the identified list will be considered as the collocated picture, otherwise, if the number of reference pictures in the identified list is more than one, another syntax element, collocated_ref_idx, is used to identify which picture in the identified list is to be identified as the collocated picture. By way of non-limiting example, if collocated_from_l0_flag is 1, there are five reference pictures are defined in list 0, and collocated_ref_idx is 2, the third picture in list 0 would be identified as the collocated picture.

Because any picture in the reference picture set (RPS) can be employed as a collocated picture and it is an encoder choice to select which picture in the RPS is set as the collocated picture, motion information for all reference pictures must be kept/stored at both encoder and decoder. In the HEVC system, motion information is kept based upon block sizes of 16×16 to have a better trade-off between coding performance and memory consumption requirement (s). Thus, in a situation in which five reference pictures are defined for coding a 1080p sequence in one HEVE encoder/ decoder, 8160 blocks of size 16×16 ((1920/16)*(1080/16)) for one picture will be required. For B picture, there will be list 0 and list 1. 16 bits are required to store a motion vector and there are horizontal and vertical components for each motion vector. As a result, there are 5*8160*2*2*2=326,400 bytes needed to store all required motion vectors. For each block, the coding mode and reference index for both lists also need to be stored. Thus, in a system in which one byte is needed to store the mode and another two bytes are required for possible two reference indexes, another 5*8160*3=122,400 bytes are needed to store all information. Furthermore, additional memory is also needed to store the reference picture set (RPS) for all slices of all coded/decoded reference pictures. Thus, at least 448,800 bytes are needed to store temporal motion information in such a limited example.

In the JVET system, a smaller block size of 4×4 has been proposed to provide fine motion information. Therefore, the memory consumption requirement for JVET could be sixteen times more compared with that for HEVC.

Figure 7:
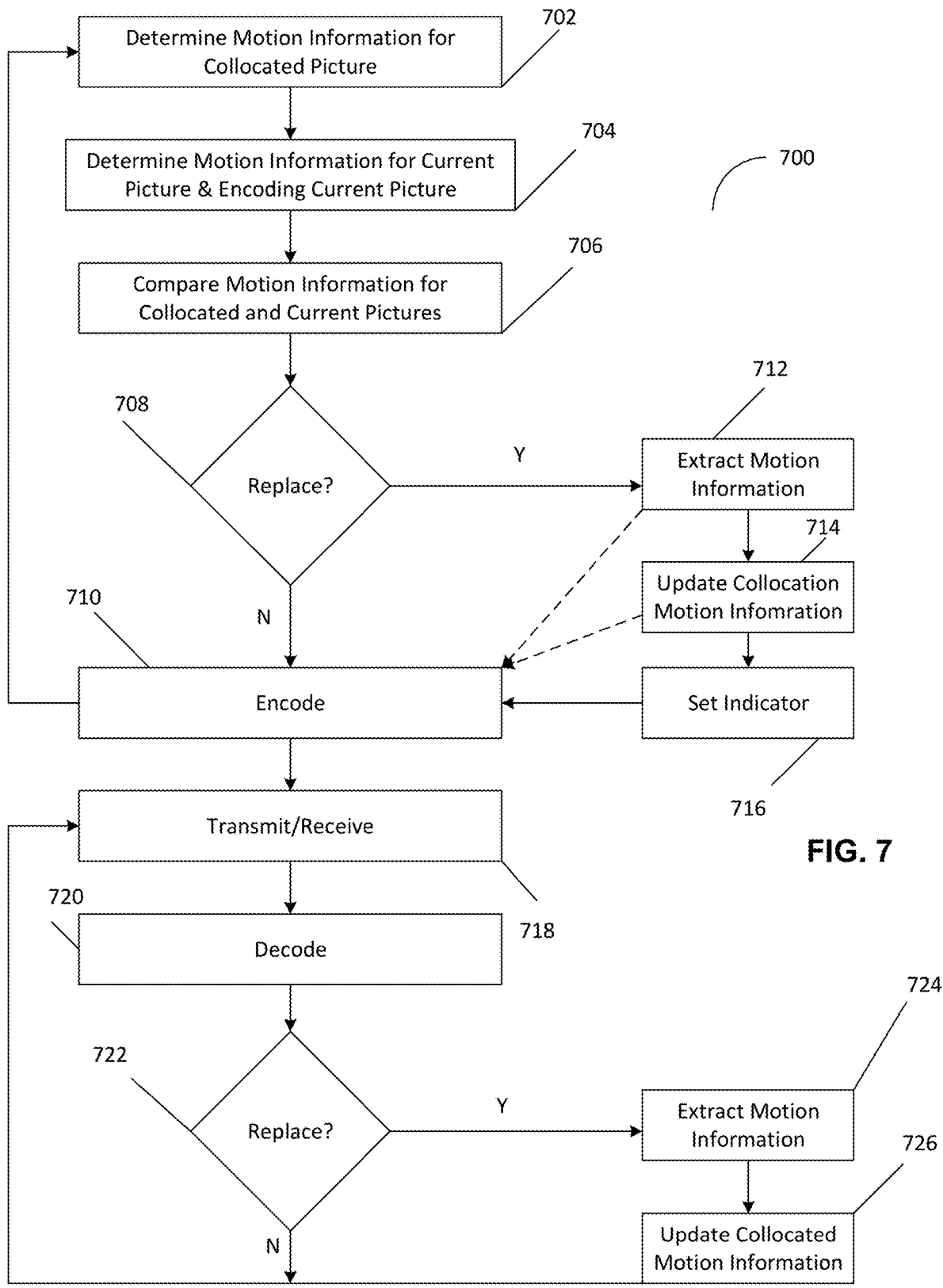
FIG. 7 depicts a block diagram of a system and method of motion information storage for video coding and signaling.

FIG. 7 depicts an efficient method of motion information storage for video coding and signaling. 700. In the embodiment depicted in FIG. 7, in step 702 motion information associated with a collocated picture is determined, then in step 704 motion information associated with a current picture and encoding current picture is determined. In step 706, the motion information for each of the collocated picture and the current picture are compared and in step 708 it is determined whether motion information associated with the current picture or the collocated picture should be updated and transmitted. In some embodiments, step 706 may be absent. If, in step 708, it is determined that motion information should not be updated, then in step 710, the system can proceed to encode the picture and include a flag indicator in the packet that indicates that the most recently stored motion information should be used for decoding the picture. However, if in step 708 it is determined that motion information should be updated, then in step 712 the motion information can be extracted for coding, in step 714 motion information stored at the encoder can be updated and then in step 716 an indicator can be established for inclusion in the encoded transmission that can signal to the decoder that the collocated motion information should be updated. Then in step 710, the updated collocation motion information, and indicator can be encoded with the picture in step 710. As depicted, in FIG. 7, in some embodiments, step 712 can provide information directly to the encoding step 710 and/or to step 714. Additionally, in some embodiments, step 712 and/or step 708 can directly trigger the step of setting the update indicator in step 716. That is, in some embodiments steps 714 and 716 may occur in parallel or in a sequence other than sequentially, as depicted in FIG. 7.

In step 718, a picture encoded in step 710 can be transmitted and received. In step 720 the recipient decoder can decode the received picture and determine whether the received transmission includes an indicator to update or replace its collocated motion information. If the transmission does not contain an indicator indicating that update/replacement of the collocated motion information is instructed, then the decoder can proceed to step 718 and await/receive the next picture. However, it is step 720 the decoder detects that an indicator has been received to update the collocated motion information, then a replacement/update decision can be triggered in step 722 and in step 724 the updated collocated motion information can be extracted and in step 726 the collocated motion information stored at the decoder can be updated in step 726, before the system proceeds back to step 718 to await/receive the next picture. However, in some alternate embodiments, the decoding 722 can proceed in parallel with the step 724 and 726 and/or decoding 722 can receive updated collocated motion information directly from step 724.

As described in relation to FIG. 7, in operation for a current picture, only the motion information of its collocated picture need be kept/stored at both encoder and decoder, and the motion information of other reference pictures in the reference buffer need not be kept/stored at the encoder and decoder. As described in reference to FIG. 7, in operation since there is only one collocated picture per current picture, the memory requirement for storing the motion information at both the encode and decoder can be reduced by N(=N/1) times, assuming there were N reference pictures in the reference buffer utilizing previous systems, as compared with the existing video coding standards.

Thus, in operation, the encoder can, using any known, convenient and/or desired system and/or method, determine if a current coded slice/picture will be used as collocated picture for the future pictures. If yes, the current coded picture will be signaled and its motion information, including its blocks' modes, motion vectors and reference indices from the reference lists, will be kept/stored for future coding/decoding, and the previously stored motion information of the past collocated picture will be replaced by the motion information of the new collocated picture. In some alternate embodiments, more than one reference picture/slice can be stored.

Moreover, depending on different applications, for a current block in a current picture, its collocated block in the collocated picture can be defined differently. By way of non-limiting example, the collocated block can be defined as the bottom right or center block related to the position of current block in the collocated picture, as in HEVC. However, in some alternate embodiments, a collocated block can be defined as a block pointed by motion vector and reference index of one of inter spatial neighboring block of current block, as in JVET and/or VVC.

Additionally, in some embodiments, motion information of a collocated block can serve as motion information of one of the candidates of merge mode or as a motion vector predictor for coding a current block in the current picture and, in some embodiments, a collocated picture may not be a reference picture, but can be a non-reference picture.

At the decode side, the signaled flag can be decoded to check if the current decoded slice/picture is to be used as collocated picture for future pictures. If yes, the motion information of the current decoded picture, including its blocks' modes, motion vectors and reference indices from the reference lists, are to be kept/stored for future coding/decoding, and the previously stored motion information of the past collocated picture can be be replaced by the motion information of the new collocated picture. Thus, in some embodiments, a collocated picture may not necessarily be a reference picture for a current picture and it can be any previously coded/decoded picture.

In current systems, the collocated picture was signaled at SPS and slice levels. However, earlier signaling can improve performance and efficiency. Accordingly, as depicted in FIG. 7, signaling of the collocated picture can be indicated at the Network Abstraction Layer (NAL) unit level to provide more flexibility. By way of non-limiting example, in some embodiments, the NAL type can be changed to indicate whether the current CVS (coded video sequence) is a collocated picture or not. In an alternate embodiment, a one-bit flag can be added in the NAL to indicate whether the current CVS (coded video sequence) is a collocated picture or not.

In some embodiments, the video coding unit is a (Network Abstraction Layer) NAL unit or a slice unit having similar definition in VVC, HEVC or JVET, and signaling of a collocated picture can happen at the NAL or slice levels. However, in some embodiments, a single coding picture can have more than one NAL or slice. Thus, in some embodiments, if one NAL unit or slice is signaled to be the collocated picture, other NAL units or slices associated with the same picture can be signaled to be the collocated picture, thereby further reducing bandwidth requirements associated with video transmission. That is for a given picture referred to by the collocated picture, the signaling flag should be the same for all slices/NAL unit of a coded picture.

Figure 8:
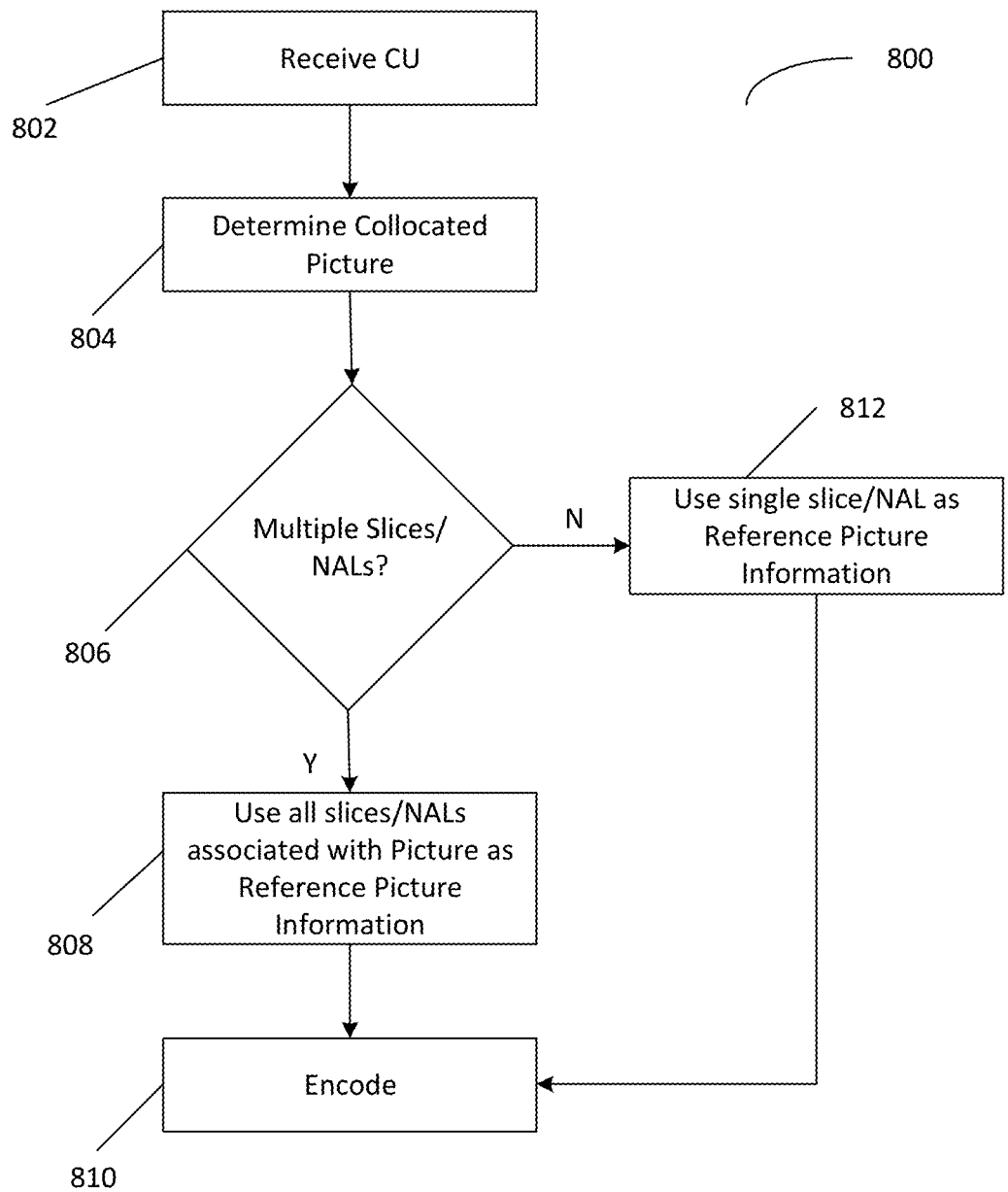
FIG. 8 depicts a block diagram of a system and method of selection of a reference picture.

FIG. 8 depicts a block diagram 800 of a system and method of selection of a reference picture. In the embodiment depicted in FIG. 8, in step 802 information regarding a CU is received and then in step 804 information regarding a collocated picture is determined. In step 806 it is determined whether the collocated picture is comprised of more than one slice or NAL. If in step 806 it is determined that the collocated picture is comprised of more than one slice or NAL, then in step 808 all slices/NALs associated with the picture are used to identify the picture as a reference picture and encoding can proceed in step 810. However, if in step 806 it is determined that the collocated picture is comprised of only one slice or NAL, then encoding can proceed in a standard manner in step 810.

Figure 9:
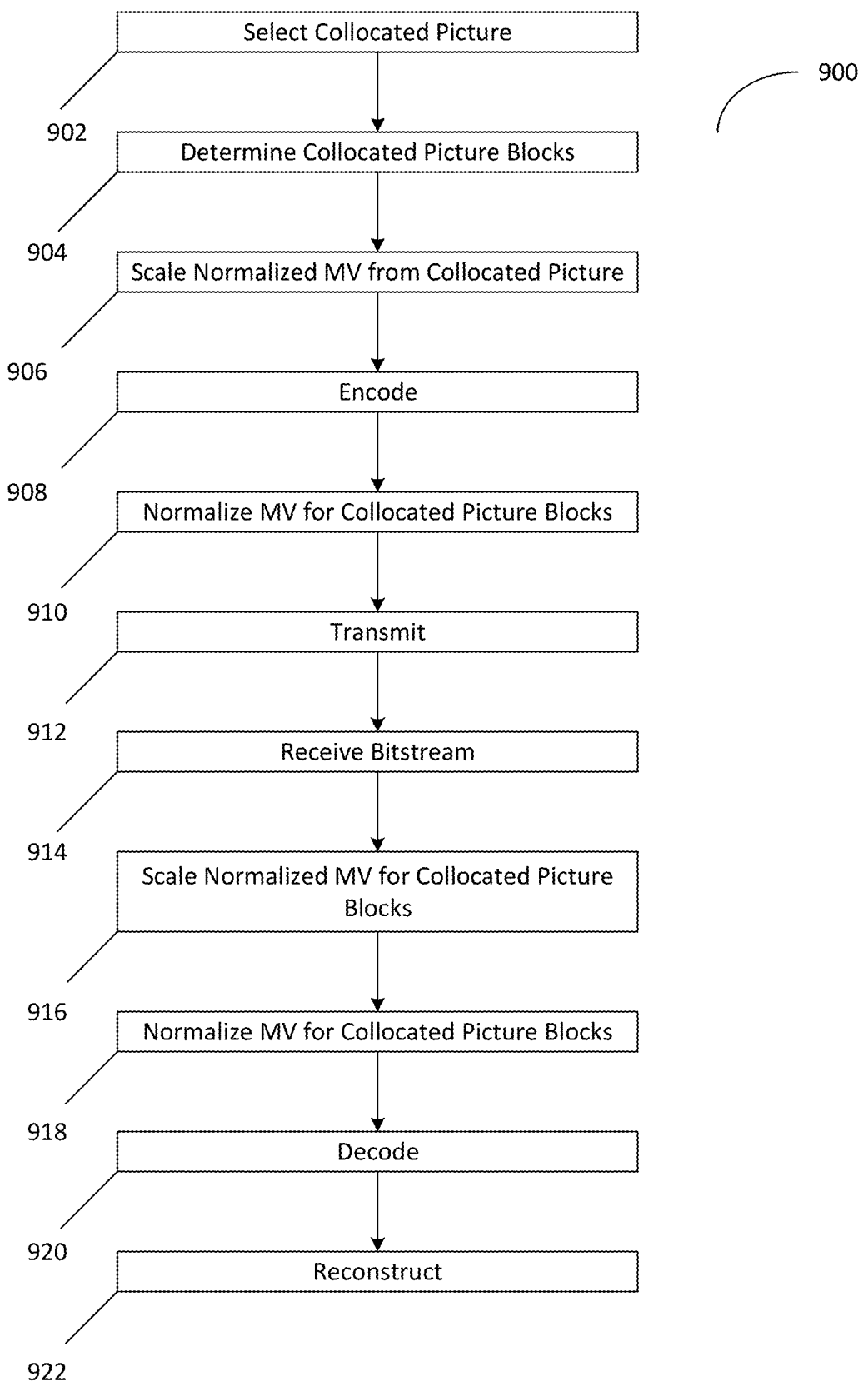
FIG. 9 depicts a block diagram of a system and method for reducing system burden associated with motion information.

In some embodiments as depicted in FIG. 9, in order to further reduce memory usage, normalized motion information can be used instead of complete or compressed motion information. Thus, in some embodiments, once a picture is selected as a collocated picture, the motion vector(s) for each of the selected collocated picture's blocks can be normalized based upon the POC difference between the picture and the block's corresponding reference picture and then stored in accordance with the following equations:

$$MV\_x\_stored = MV\_x/(POC\_picture - POC\_reference)$$

$$MV\_y\_stored = MV\_y/(POC\_picture - POC\_reference)$$

wherein, POC_picture and POC_reference denote POC of the picture and POC of reference picture for the block, and MV_x and MV_y denote the (x,y) components of motion vector for the block. The motion vector components of MV_x and MV_y can then be normalized as MV_x_stored and MV_y_stored.

The normalized (MV_x_stored, MV_y_stored) motion vector can then be stored for the collocated picture. Depending on the desired application, the block size for motion vector storage can be different. By way of non-limiting example, a size of 16×16 and 4×4 can be used for HEVC and JVET or VVC, respectively. However, in alternate embodiments any known, convenient and/or desired size can be employed.

At the encoder side, if the current encoding picture is selected as the collocated picture for other pictures, some or all of the motion vectors for some or all of the blocks in the current encoding picture can be stored. Alternately, if, at the decoder side, the current decoding picture is selected as collocated picture, some or all the motion vectors for some or all the blocks in the current decoding picture will be stored.

In some embodiments in which more than one list exists, all MVs for all lists can be normalized. Moreover, if the current block is an intra block, the MV can be set as 0, as follows:

$$MV\_x\_stored = 0$$

$$MV\_y\_stored = 0$$

It is noteworthy that once a motion vector for a block is normalized, the associated reference index and coding mode need not be stored.

In some embodiments, a motion vector for only one list instead of two lists can be stored to reduce the memory requirements/usage.

By way of non-limiting example, in some embodiments normalized motion vectors can be determined and stored for the collocated picture according to the above-provided equations. Thus, when a current block is encoded in a current picture, the POC for the current picture and the collocated picture are POC_current and POC_collocated, respectively. Accordingly, the temporal motion vector predictor (MV_x_TMVP, MV_y_TMVP) for the current block can be obtained by scaling the normalized motion vector of its collocated block based upon the POC difference between the current coding picture and its collocated picture in accordance with the following equations:

$$MV\_x\_TMVP = MV\_x\_col\_stored * (POC\_current - POC\_collocated)$$

$$MV\_y\_TMVP = MV\_y\_col\_stored * (POC\_current - POC\_collocated) \quad (3)$$

where (MV_x_col_stored, MV_y_col_stored) are two components of the stored normalized motion vector for the collocated block in the collocated picture. Thus, in some embodiments, the collocated block can have different definitions depending on different applications. By way of non-limiting example, in some embodiments, a collocated block can be defined as a block in the same position in the collocated picture in HEVC and can then be defined as a block which is pointed by a motion vector and a reference picture of a spatial neighbor of the current block.

In the block flow diagram 900 depicted in FIG. 9, in step 902 a collocated picture is selected and then in step 904 collocated picture blocks are determined. In step 906 a normalized motion vector can be scaled prior to encoding in step 908. Then in step 910 normalized collocated picture blocks can be determined as described herein and the encoded signal can be transmitted in step 912. At the decoder side, in step 914 a bitstream can be received in step, then, if normalized MVs are indicated, the normalized MV information can be scaled in step 916 in accordance with techniques described herein and the normalized motion vector can be stored for use as a future collocated picture block. Then in step 920 the signal can be decoded in accordance with techniques and systems described herein and a picture can be reconstructed in step 922.

Figure 10:
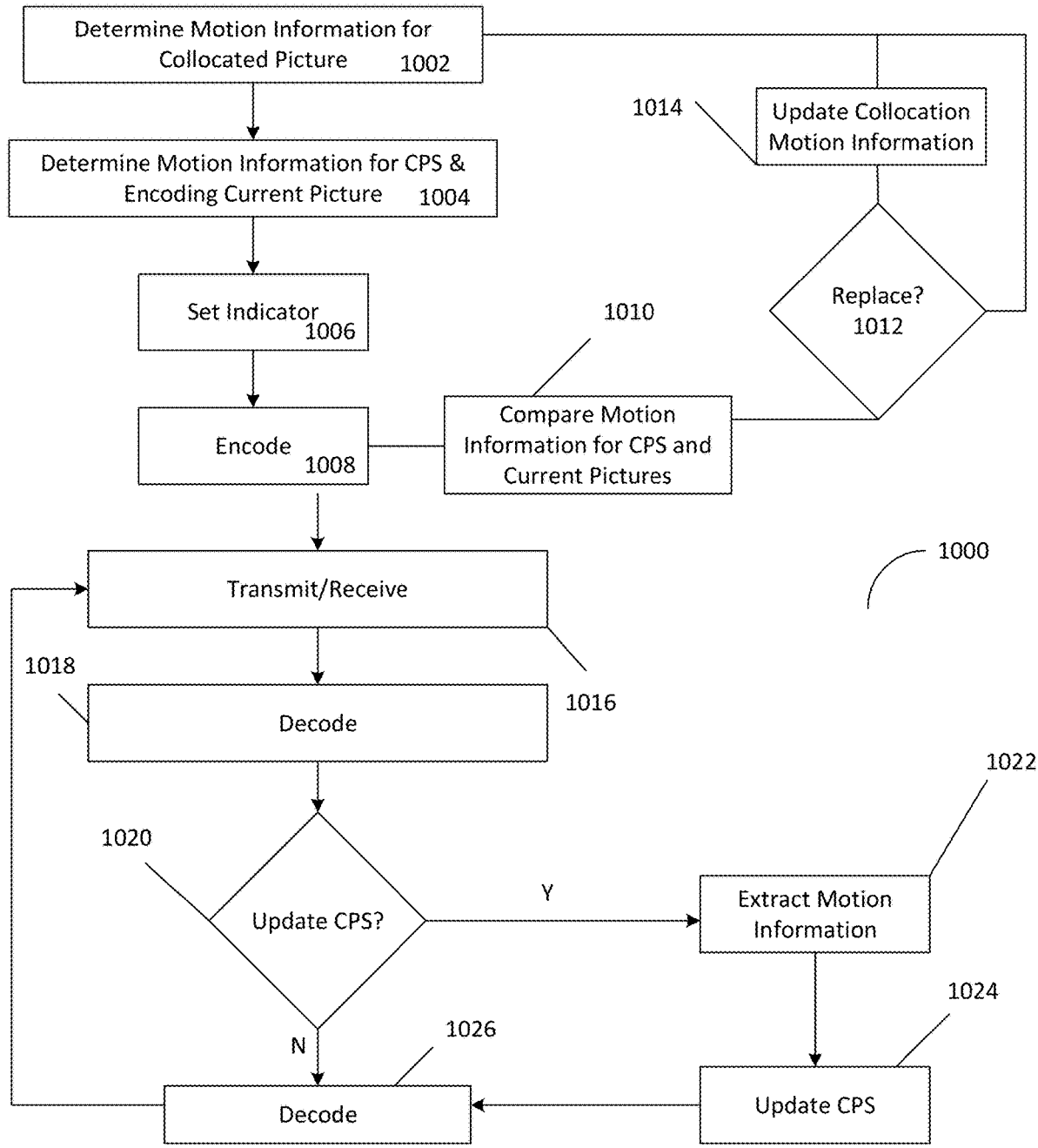
FIG. 10 depicts a block diagram of a system and method of motion information storage for video coding and signaling.

In accordance with some embodiments as depicted in FIG. 10, more than one identified collocated picture can be identified, but not all identified collocated pictures may be updated. That is, in some embodiments there can be a number of N pictures considered as collocated pictures where N is an integer and may be larger than one. The N collocated pictures can be identified as a collocated picture set (CPS) and CPS can be managed in a similarly to reference picture set (RPS) in HEVC and/or in any other known, convenient and/or desired manner. In some embodiments, a CPS can contain the POC information for each collocated picture and can be formed by using first in first out (FIFO) methodology and/or any other known convenient and/or desired methodology. That is, if a new collocated picture is identified, it can be appended to the current CPS if the number of collocated pictures identified in the CPS is less than N and/or a newly identified collocated picture can replace the oldest collocated pictures within the list of N entries, in the case where the CPS currently contains N entries. In alternate embodiments, a first index can be signaled to specify the index of collocated picture in CPS to be replaced by a new collocated picture. Thus, in some embodiments, a special index can be coded to specify which collocated picture in the CPS is used if N is larger than one. The special index can be signaled at the CU, picture, or other level. In some embodiments, all blocks of current picture can use the same collocated picture. However, in alternate embodiments, blocks of a current picture can use different collocated pictures and which collocated picture is to be used can be specified by the special index for each block. However, in a special case in which the number of collocated pictures is one, there would be no need to have a special index coded to specify the collocated picture. Thus in the situation where the CPS contains multiple entries, for each coded picture, if the coded picture is considered as a collocated picture for other future pictures, the coded picture can be specified and the motion information of the coded picture, either motion related information or normalized motion information, can be kept/stored and this new collocated picture can be inserted CPS or replace an existing entry in the current CPS.

In some embodiments, for a current picture, a special index can identify which collocated picture in the CPS is to be used for the current picture. The collocated picture for current picture can then be determined according to such a special index. If a current coded slice/picture is to be used as collocated picture for future pictures, a flag indicating usage of the current coded picture as a collocated picture for future pictures and possibly an index indicating which collocated picture in the CPS is to be removed and replaced by the current picture can be signaled and its motion information, including its blocks' modes, motion vectors and reference indices from the reference lists or normalized motion information, can be kept/stored for future coding/decoding.

At the decode side, for a current picture, an index which specifies the collocated picture in CPS can be decoded before decoding the current. The collocated picture for the current picture can then be determined according to the identified decoded index. Thus, in some embodiments, the signaled flag can be decoded to verify whether the current decoded slice/picture will be used as collocated picture for future pictures. If it is determined that the current decoded slice/picture will be used as a collocated picture for future pictures then the motion information of the current decoded picture, including its blocks' modes, motion vectors and reference indices from the reference lists or normalized motion information, can be kept/stored for future coding/decoding, and the previously stored motion information of one of collocated pictures (for example, the first stored past collocated picture) can be replaced by the motion information of the new collocated picture.

In some embodiments in which blocks of current picture can use a different collocated picture, a special index can be coded for each block before coding the current block instead of coding a special index for a whole picture. By way of non-limiting example, in the case where there are two collocated pictures in the CPS, when the current picture is encode/decode, an index, which can be in the current slice header, can indicate which of the two pictures is to be the collocated picture for all blocks of the current picture. Thus, there is a choice to select which collocated picture is used for the current picture according to the encoded/decoded index.

FIG. 10 depicts a block flow diagram of an efficient method of motion information storage for video coding and signaling. 1000. In the embodiment depicted in FIG. 10, in step 1002 motion information associated with a collocated picture of an encoding current picture is determined, then in step 1004 motion information associated with a Collocated Picture Set (CPS) and encoding current picture is determined. In step 1006, an indicator can be established for inclusion in the encoded transmission that can signal to the decoder whether collocated motion information in the CPS should be updated, then in step 1008 encoding can proceed. Then in step 1010 the motion information for the current picture can be compared against motion information in the CPS. In step 1012 it can be determined whether replacement of motion information in the CPS is desired. If in step 1012 it is determined that update of the motion information in the CPS is desired, then in step 1014, the collocation motion information can be updated in the CPS and the system can return to step 1002. In some embodiments the signal can indicate replacement of a specific entry in the CPS. However, in alternate embodiments, as described herein, a FIFO system can be used for updates to the CPS and in still further alternate embodiments, the CPS can be updated in any known, convenient and/or desired manner. However, if in step 1012 it is determined that update of the CPS is not desired, then the system can return to step 1002

In step 1016, a picture encoded in step 1008 can be transmitted and received. In step 1018 the recipient decoder can decode that portion of the stream related to whether there is an update to the CPS and determine whether to update or replace an entry in the CPS in step 1020. If in step 1020 it is determined that no update/replacement in the CPS is required, then decoding can proceed using the current CPS in step 1026. However, if in step 1020 it is determined that an update/replacement to the CPS is indicated, then in step 1022 the motion information can be extracted and the CPS can be updated in step 1024 prior to decoding of the balance of the bitstream in step 1026. In some alternate embodiments, the decoding 1018 can proceed in parallel with the step 1022 and 1024 and/or decoding 1018 can receive updated collocated motion information directly from step 1022.

Figure 11:
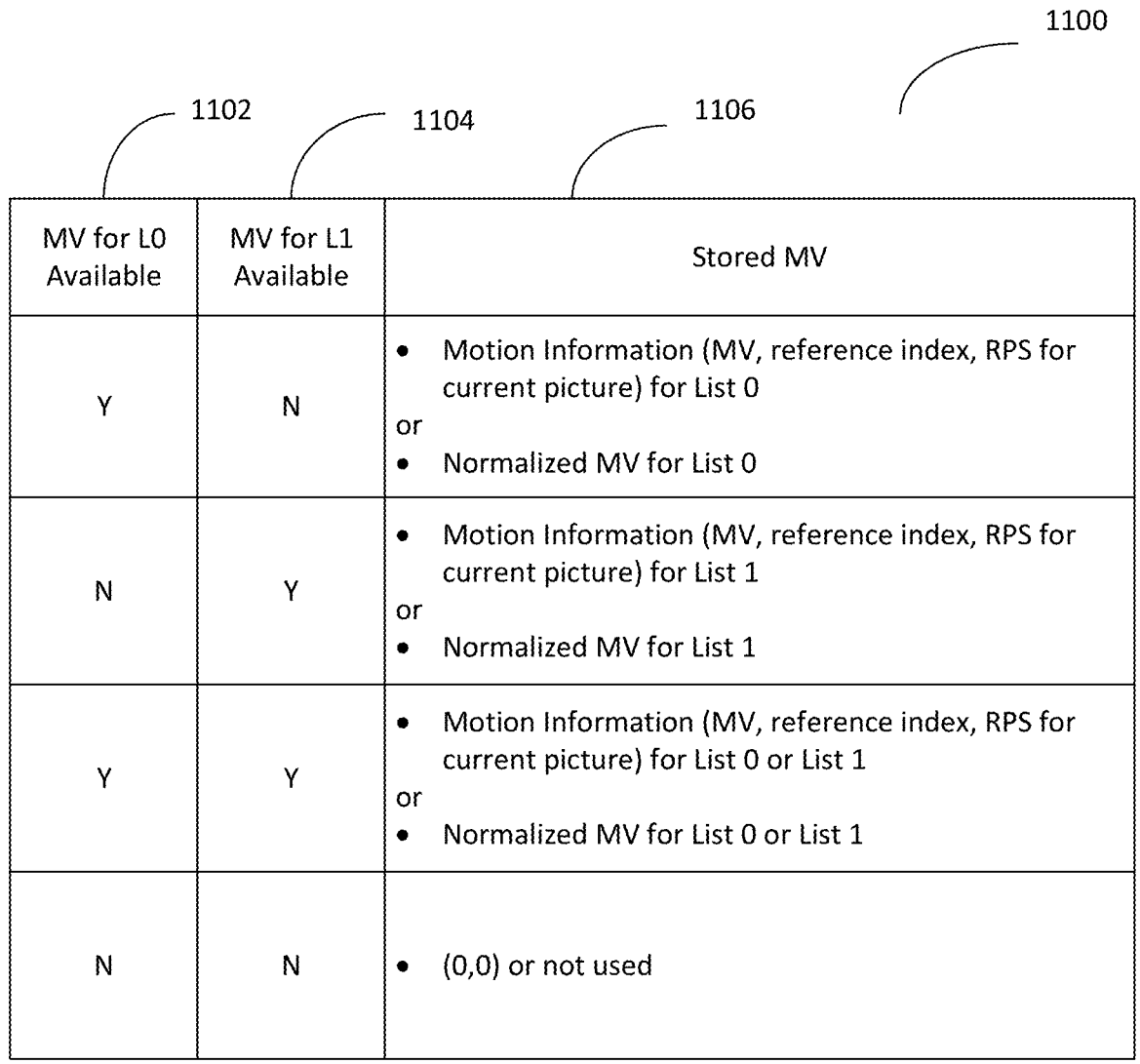
FIG. 11 depicts a table showing a system and method for reducing system burden associated with motion information.

FIG. 11 depicts a tabular view of an alternate system and method to adjust memory requirements for stored temporal motion vectors 1100. In some embodiments, the resolution of a stored temporal motion vector can be included in the bitstream. By way of non-limiting example, the resolution of a stored temporal motion vector can be explicitly signaled directly in the bitstream. That is, in some embodiments, the resolution of stored temporal motion vector can be specified and included in bitstream at the SPS, PPS or other levels. Additionally, in some embodiments, a syntax element can be specified to indicate either eighth pel, quarter pel, integer pel, four pel and/or a combination of pel possibilities and can be used to store motion vectors according to different applications or different needs or desires. The resolution can be selected based on the application, need or desire to implement a given resolution. In some embodiments, a resolution of the stored motion vector can be selected or designated by a user.

In some embodiments, the size of a stored temporal motion vector can be included in the bitstream. By way of non-limiting example, the size of a stored temporal motion vector can be specified and included in bitstream, at the SPS, PPS or other levels. Moreover, in some embodiments, a syntax element can be specified to indicate either one byte, two bytes, or four bytes, or a combination of byte possibilities can be used to store each component of motion vector.

As noted above, in some embodiments, in order to further reduce memory usage, normalized motion information can be used instead of complete or compressed motion information. Thus, in some embodiments, once a picture is selected as a collocated picture, the motion vector(s) for each of the selected collocated picture's blocks can be normalized based upon the POC difference between the picture and the block's corresponding reference picture and then stored in accordance with the following equations:

$$MV\_x\_stored = MV\_x/(POC\_picture - POC\_reference)$$

$$MV\_y\_stored = MV\_y/(POC\_picture - POC\_reference)$$

wherein, POC_picture and POC_reference denote POC of the picture and POC of reference picture for the block, and MV_x and MV_y denote the (x,y) components of motion vector for the block. The motion vector components of MV_x and MV_y can then be normalized as MV_x_stored and MV_y_stored.

In order to reduce rounding errors, the stored motion vector can be scaled. In some embodiments, the stored motion vector and/or the scaling factor can be specified and included in bitstream, at the SPS, PPS or other levels. Thus, an alternative normalized motion vector is defined as follows:

$$Normalized\_MV\_x\_stored = scaling\_factor * MV\_x/(POC\_picture - POC\_reference).$$

$$Normalized\_MV\_y\_stored = scaling\_factor * MV\_y/(POC\_picture - POC\ reference).$$

where
the scaling_factor is a scaling factor specified and can be, by way of non-limiting example 8, 16, 24 or more.

In some embodiments, if a block has motion vector for a single list, for example, list 0 only, motion information (motion vector, reference index, RPS for the current picture etc.) for list 0 only can be stored or the normalized motion vector for list 0 only can be stored. If an embodiment comprises multiple lists, (for example, if both list0, list1 are available for a block), then motion information (motion vector, reference index, RPS for the current picture etc.) for either list0/list1 can be stored or the normalized motion vector for list0/list1 can stored. Additionally, if an embodiment the block comprises motion vectors for a single list (for example, list 1) where in which are multiple list options, (for example list1 only, but lists 0 and 1 exist and are available), then motion information (motion vector, reference index, RPS for the current picture etc.) for list 1 only can be stored or the normalized motion vector for list 1 only can be stored. A tabular formation 1100 of this example is presented in FIG. 11, in which 1102 indicates whether motion vector information is available for list0, 1104 indicates whether motion vector information is available for list1, 1106 indicates which motion information will be stored based on the various conditions/availability of list0/list1 presented in the rows of the table 1100.

However, in some alternate embodiments in which a temporal motion vector is used, a stored temporal motion vector is accordingly scaled regardless of which lists are available for the current block.

Figure 12:
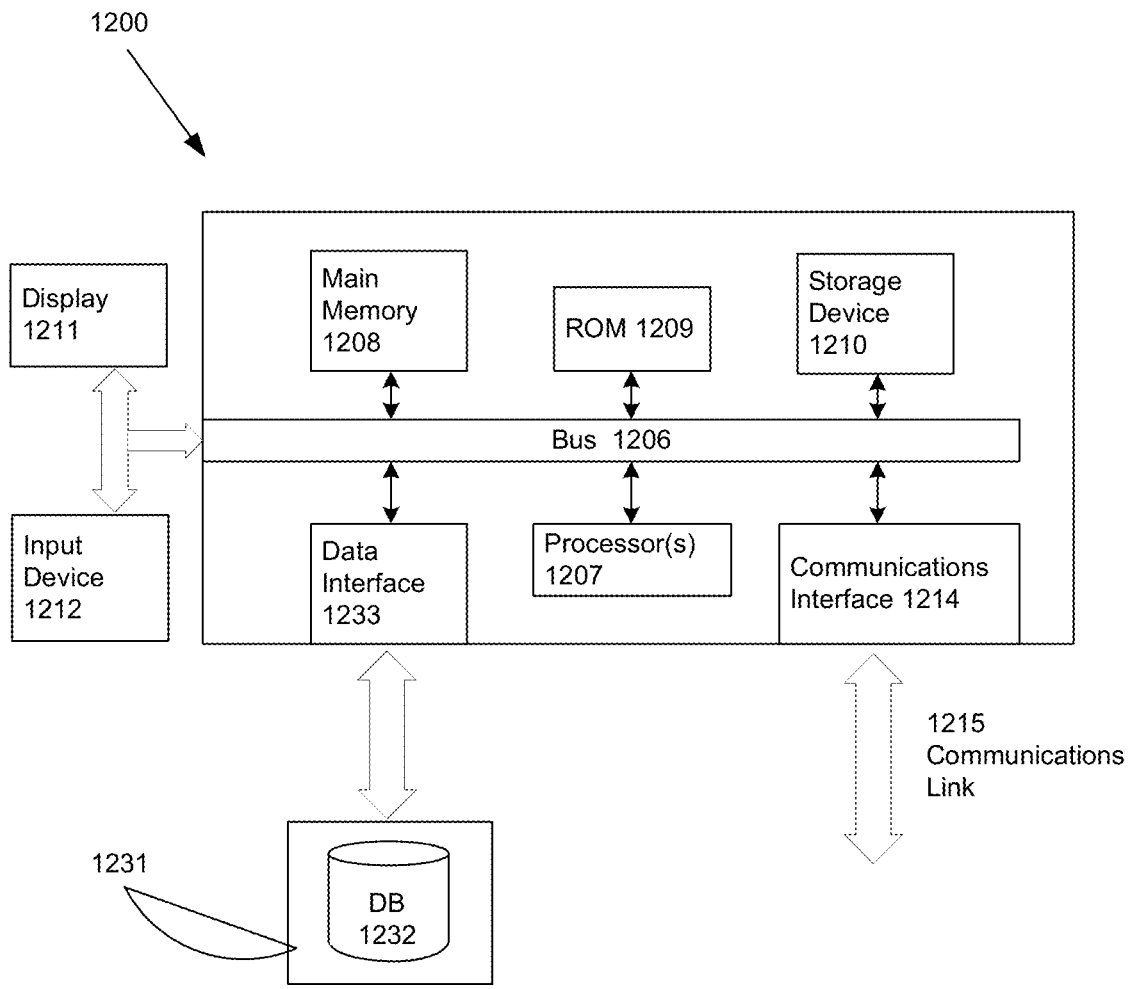
FIG. 12 depicts an embodiment of a computer system adapted and configured to provide for variable template size for template matching.

The execution of the sequences of instructions required to practice the embodiments can be performed by a computer system 1200 as shown in FIG. 12. In an embodiment, execution of the sequences of instructions is performed by a single computer system 1200. According to other embodiments, two or more computer systems 1200 coupled by a communication link 1215 can perform the sequence of instructions in coordination with one another. Although a description of only one computer system 1200 will be presented below, however, it should be understood that any number of computer systems 1200 can be employed to practice the embodiments.

A computer system 1200 according to an embodiment will now be described with reference to FIG. 12, which is a block diagram of the functional components of a computer system 1200. As used herein, the term computer system 1200 is broadly used to describe any computing device that can store and independently run one or more programs.

Each computer system 1200 can include a communication interface 1214 coupled to the bus 1206. The communication interface 1214 provides two-way communication between computer systems 1200. The communication interface 1214 of a respective computer system 1200 transmits and receives electrical, electromagnetic or optical signals, that include data streams representing various types of signal information, e.g., instructions, messages and data. A communication link 1215 links one computer system 1200 with another computer system 1200. For example, the communication link 1215 can be a LAN, in which case the communication interface 1214 can be a LAN card, or the communication link 1215 can be a PSTN, in which case the communication interface 1214 can be an integrated services digital network (ISDN) card or a modem, or the communication link 1215 can be the Internet, in which case the communication interface 1214 can be a dial-up, cable or wireless modem.

A computer system 1200 can transmit and receive messages, data, and instructions, including program, i.e., application, code, through its respective communication link 1215 and communication interface 1214. Received program code can be executed by the respective processor(s) 1207 as it is received, and/or stored in the storage device 1210, or other associated non-volatile media, for later execution.

In an embodiment, the computer system 1200 operates in conjunction with a data storage system 1231, e.g., a data storage system 1231 that contains a database 1232 that is readily accessible by the computer system 1200. The computer system 1200 communicates with the data storage system 1231 through a data interface 1233. A data interface 1233, which is coupled to the bus 1206, transmits and receives electrical, electromagnetic or optical signals, that include data streams representing various types of signal information, e.g., instructions, messages and data. In embodiments, the functions of the data interface 1233 can be performed by the communication interface 1214.

Computer system 1200 includes a bus 1206 or other communication mechanism for communicating instructions, messages and data, collectively, information, and one or more processors 1207 coupled with the bus 1206 for processing information. Computer system 1200 also includes a main memory 1208, such as a random access memory (RAM) or other dynamic storage device, coupled to the bus 1206 for storing dynamic data and instructions to be executed by the processor(s) 1207. The main memory 1208 also can be used for storing temporary data, i.e., variables, or other intermediate information during execution of instructions by the processor(s) 1207.

The computer system 1200 can further include a read only memory (ROM) 1209 or other static storage device coupled to the bus 1206 for storing static data and instructions for the processor(s) 1207. A storage device 1210, such as a magnetic disk or optical disk, can also be provided and coupled to the bus 1206 for storing data and instructions for the processor(s) 1207.

A computer system 1200 can be coupled via the bus 1206 to a display device 1211, such as, but not limited to, a cathode ray tube (CRT) or a liquid-crystal display (LCD) monitor, for displaying information to a user. An input device 1212, e.g., alphanumeric and other keys, is coupled to the bus 1206 for communicating information and command selections to the processor(s) 1207.

According to one embodiment, an individual computer system 1200 performs specific operations by their respective processor(s) 1207 executing one or more sequences of one or more instructions contained in the main memory 1208. Such instructions can be read into the main memory 1208 from another computer-usable medium, such as the ROM 1209 or the storage device 1210. Execution of the sequences of instructions contained in the main memory 1208 causes the processor(s) 1207 to perform the processes described herein. In alternative embodiments, hard-wired circuitry can be used in place of or in combination with software instructions. Thus, embodiments are not limited to any specific combination of hardware circuitry and/or software.

The term "computer-usable medium," as used herein, refers to any medium that provides information or is usable by the processor(s) 1207. Such a medium can take many forms, including, but not limited to, non-volatile, volatile and transmission media. Non-volatile media, i.e., media that can retain information in the absence of power, includes the ROM 1209, CD ROM, magnetic tape, and magnetic discs. Volatile media, i.e., media that can not retain information in the absence of power, includes the main memory 1208. Transmission media includes coaxial cables, copper wire and fiber optics, including the wires that comprise the bus 1206. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the embodiments have been described with reference to specific elements thereof. It will, however, be evident that various modifications and changes can be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. The specification and drawings are, accordingly, to be regarded in an illustrative rather than restrictive sense.

It should also be noted that the present invention can be implemented in a variety of computer systems. The various techniques described herein can be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object oriented programming language to communicate with a computer system. However, the programs can be implemented in assembly or machine language, if desired. In any case, the language can be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The system can also be considered to be implemented as a computer-readable storage medium, configured with a computer program, where the storage medium so configured causes a computer to operate in a specific and predefined manner. Further, the storage elements of the exemplary computing applications can be relational or sequential (flat file) type computing databases that are capable of storing data in various combinations and configurations.

Figure 13:
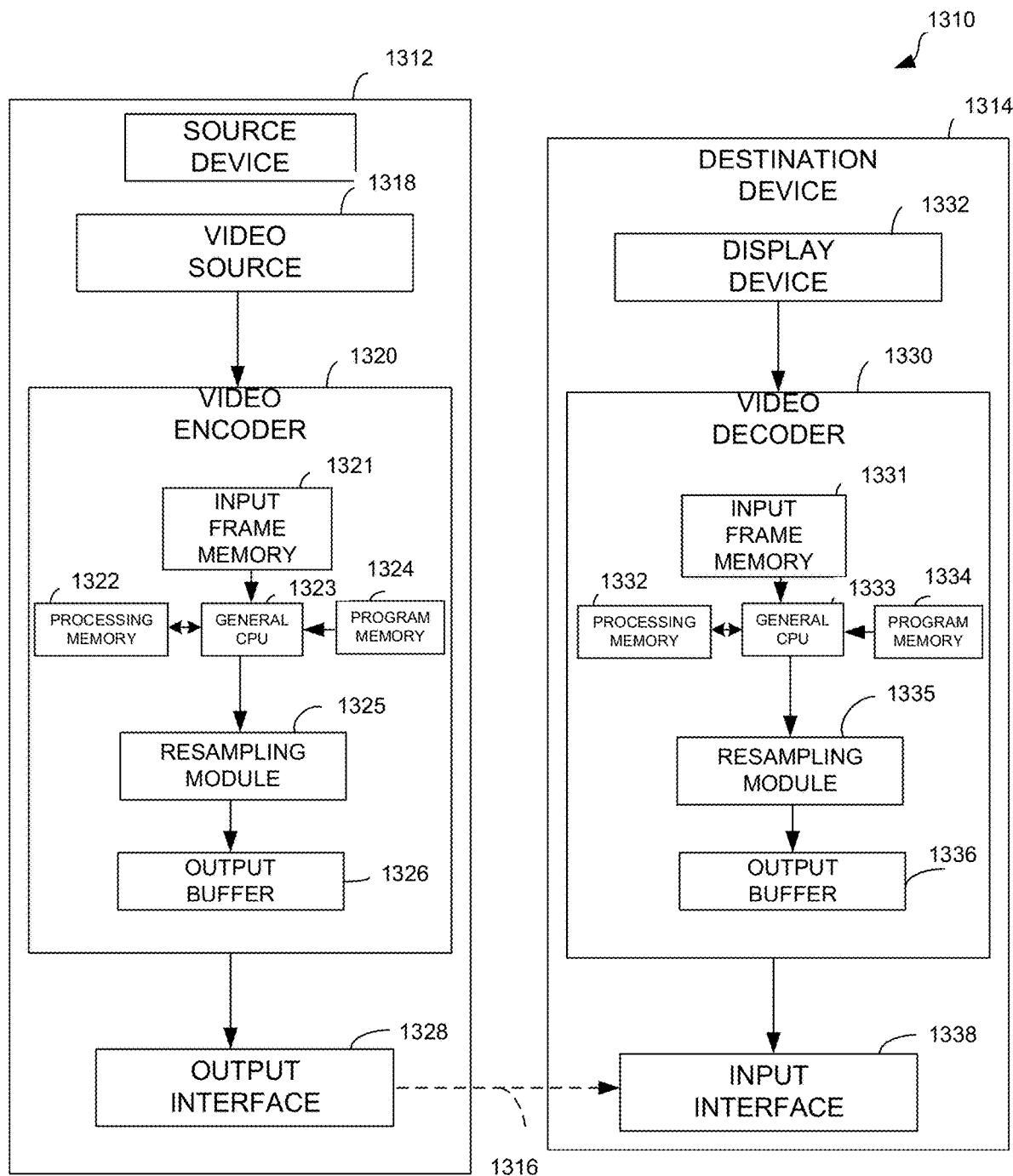
FIG. 13 depicts an embodiment of video encoder/decoder adapted and configured to provide for variable template size for template matching.

FIG. 13 is a high level view of a source device 1312 and destination device 1310 that may incorporate features of the systems and devices described herein. As shown in FIG. 13, example video coding system 1310 includes a source device 1312 and a destination device 1314 where, in this example, the source device 1312 generates encoded video data. Accordingly, source device 1312 may be referred to as a video encoding device. Destination device 1314 may decode the encoded video data generated by source device 1312. Accordingly, destination device 1314 may be referred to as a video decoding device. Source device 1312 and destination device 1314 may be examples of video coding devices.

Destination device 1314 may receive encoded video data from source device 1312 via a channel 1316. Channel 1316 may comprise a type of medium or device capable of moving the encoded video data from source device 1312 to destination device 1314. In one example, channel 1316 may comprise a communication medium that enables source device 1312 to transmit encoded video data directly to destination device 1314 in real-time.

In this example, source device 1312 may modulate the encoded video data according to a communication standard, such as a wireless communication protocol, and may transmit the modulated video data to destination device 1314. The communication medium may comprise a wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or other equipment that facilitates communication from source device 1312 to destination device 1314. In another example, channel 1316 may correspond to a storage medium that stores the encoded video data generated by source device 1312.

In the example of FIG. 13, source device 1312 includes a video source 1318, video encoder 1320, and an output interface 1322. In some cases, output interface 1328 may include a modulator/demodulator (modem) and/or a transmitter. In source device 1312, video source 1318 may include a source such as a video capture device, e.g., a video camera, a video archive containing previously captured video data, a video feed interface to receive video data from a video content provider, and/or a computer graphics system for generating video data, or a combination of such sources.

Video encoder 1320 may encode the captured, pre-captured, or computer-generated video data. An input image may be received by the video encoder 1320 and stored in the input frame memory 1321. The general purpose processor 1323 may load information from here and perform encoding. The program for driving the general purpose processor may be loaded from a storage device, such as the example memory modules depicted in FIG. 13. The general purpose processor may use processing memory 1322 to perform the encoding, and the output of the encoding information by the general processor may be stored in a buffer, such as output buffer 1326.

The video encoder 1320 may include a resampling module 1325 which may be configured to code (e.g., encode) video data in a scalable video coding scheme that defines at least one base layer and at least one enhancement layer. Resampling module 1325 may resample at least some video data as part of an encoding process, wherein resampling may be performed in an adaptive manner using resampling filters.

The encoded video data, e.g., a coded bit stream, may be transmitted directly to destination device 1314 via output interface 1328 of source device 1312. In the example of FIG. 13, destination device 1314 includes an input interface 1338, a video decoder 1330, and a display device 1332. In some cases, input interface 1328 may include a receiver and/or a modem. Input interface 1338 of destination device 1314 receives encoded video data over channel 1316. The encoded video data may include a variety of syntax elements generated by video encoder 1320 that represent the video data. Such syntax elements may be included with the encoded video data transmitted on a communication medium, stored on a storage medium, or stored a file server.

The encoded video data may also be stored onto a storage medium or a file server for later access by destination device 1314 for decoding and/or playback. For example, the coded bitstream may be temporarily stored in the input buffer 1331, then loaded in to the general purpose processor 1333. The program for driving the general purpose processor may be loaded from a storage device or memory. The general purpose processor may use a process memory 1332 to perform the decoding. The video decoder 1330 may also include a resampling module 1335 similar to the resampling module 1325 employed in the video encoder 1320.

FIG. 13 depicts the resampling module 1335 separately from the general purpose processor 1333, but it would be appreciated by one of skill in the art that the resampling function may be performed by a program executed by the general purpose processor, and the processing in the video encoder may be accomplished using one or more processors. The decoded image(s) may be stored in the output frame buffer 1336 and then sent out to the input interface 1338.

Display device 1338 may be integrated with or may be external to destination device 1314. In some examples, destination device 1314 may include an integrated display device and may also be configured to interface with an external display device. In other examples, destination device 1314 may be a display device. In general, display device 1338 displays the decoded video data to a user.

Video encoder 1320 and video decoder 1330 may operate according to a video compression standard. ITU-T VCEG (Q6/16) and ISO/IEC MPEG (JTC 1/SC 29/WG 11) are studying the potential need for standardization of future video coding technology with a compression capability that significantly exceeds that of the current High Efficiency Video Coding HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. A recent capture of JVET development is described in the "Algorithm Description of Joint Exploration Test Model 5 (JEM 5)", JVET-E1001-V2, authored by J. Chen, E. Alshina, G. Sullivan, J. Ohm, J. Boyce.

Additionally or alternatively, video encoder 1320 and video decoder 1330 may operate according to other proprietary or industry standards that function with the disclosed JVET features. Thus, other standards such as the ITU-T H.264 standard, alternatively referred to as MPEG-4, Part 10, Advanced Video Coding (AVC), or extensions of such standards. Thus, while newly developed for JVET, techniques of this disclosure are not limited to any particular coding standard or technique. Other examples of video compression standards and techniques include MPEG-2, ITU-T H.263 and proprietary or open source compression formats and related formats.

Video encoder 1320 and video decoder 1330 may be implemented in hardware, software, firmware or any combination thereof. For example, the video encoder 1320 and decoder 1330 may employ one or more processors, digital signal processors (DSPs), application specific integrated circuits (ASICs), field programmable gate arrays (FPGAs), discrete logic, or any combinations thereof. When the video encoder 1320 and decoder 1330 are implemented partially in software, a device may store instructions for the software in a suitable, non-transitory computer-readable storage medium and may execute the instructions in hardware using one or more processors to perform the techniques of this disclosure. Each of video encoder 1320 and video decoder 1330 may be included in one or more encoders or decoders, either of which may be integrated as part of a combined encoder/decoder (CODEC) in a respective device.

Aspects of the subject matter described herein may be described in the general context of computer-executable instructions, such as program modules, being executed by a computer, such as the general-purpose processors 1323 and 1333 described above. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Examples of memory include random access memory (RAM), read only memory (ROM), or both. Memory may store instructions, such as source code or binary code, for performing the techniques described above. Memory may also be used for storing variables or other intermediate information during execution of instructions to be executed by a processor, such as processor 1323 and 1333.

A storage device may also store instructions, instructions, such as source code or binary code, for performing the techniques described above. A storage device may additionally store data used and manipulated by the computer processor. For example, a storage device in a video encoder 1320 or a video decoder 1330 may be a database that is accessed by computer system 1323 or 1333. Other examples of storage device include random access memory (RAM), read only memory (ROM), a hard drive, a magnetic disk, an optical disk, a CD-ROM, a DVD, a flash memory, a USB memory card, or any other medium from which a computer can read.

A memory or storage device may be an example of a non-transitory computer-readable storage medium for use by or in connection with the video encoder and/or decoder. The non-transitory computer-readable storage medium contains instructions for controlling a computer system to be configured to perform functions described by particular embodiments. The instructions, when executed by one or more computer processors, may be configured to perform that which is described in particular embodiments.

Also, it is noted that some embodiments have been described as a process which can be depicted as a flow diagram or block diagram. Although each may describe the operations as a sequential process, many of the operations can be performed in parallel or concurrently. In addition, the order of the operations may be rearranged. A process may have additional steps not included in the figures.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Although exemplary embodiments of the invention have been described in detail and in language specific to structural features and/or methodological acts above, it is to be understood that those skilled in the art will readily appreciate that many additional modifications are possible in the exemplary embodiments without materially departing from the novel teachings and advantages of the invention. Moreover, it is to be understood that the subject matter defined in the appended claims is not necessarily limited to the specific features or acts described above. Accordingly, these and all such modifications are intended to be included within the scope of this invention construed in breadth and scope in accordance with the appended claims.

What is claimed is:

1. A method of inter-decoding comprising:
   (a) receiving a first coding unit of a first picture from a bitstream in a first portion of memory, where said first coding unit includes a respective first NAL unit header, where said first NAL unit header includes a first indicator indicating it is part of a single collocated picture;
   (b) receiving a second coding unit of a second picture from said bitstream in a second portion of said memory, where said second coding unit includes a respective second NAL unit header, where said second NAL unit header includes a second indicator indicating it is part of said single collocated picture;
   (c) determining whether said first coding unit and said second coding unit are parts of said single collocated picture based upon information contained in at least one of said first NAL unit header and said second NAL unit header;
   (d) decoding said second coding unit using motion information associated with said first coding unit if said first coding unit and said second coding unit are parts of said single collocated picture.

2. The method of inter-coding of claim 1 wherein said motion information associated with said first coding unit is normalized.

3. The method of inter-coding of claim 2 wherein said motion information associated with said second coding unit is normalized.

4. The method of inter-coding of claim 1 wherein said first indicator is a single bit.

5. The method of inter-coding of claim 4 wherein said current coding unit is encoded according to high efficiency video coding.

6. The method of inter-coding of claim 4 wherein said current coding using is encoded according to versatile video coding.

* * * * *

UNITED STATES PATENT AND TRADEMARK OFFICE
CERTIFICATE OF CORRECTION

PATENT NO. : 11,457,233 B2
APPLICATION NO. : 16/383550
DATED : September 27, 2022
INVENTOR(S) : Yue Yu et al.

It is certified that error appears in the above-identified patent and that said Letters Patent is hereby corrected as shown below:

In the Specification

Column 7, Line 11: Delete the second occurrence of "DST-VII,"

Column 7, Line 63: Replace "NET" with --JVET--

Column 11, Line 22: Replace "signaling. 700." with --signaling 700.--

Column 22, Line 59: Delete the second occurrence of "instructions,"

Signed and Sealed this
Fifth Day of November, 2024

Katherine Kelly Vidal
*Director of the United States Patent and Trademark Office*